(12) United States Patent
Hu et al.

(10) Patent No.: US 12,106,518 B2
(45) Date of Patent: Oct. 1, 2024

(54) ON-VEHICLE CAMERA ALIGNMENT MONITORING SYSTEM

(71) Applicant: GM GLOBAL TECHNOLOGY OPERATIONS LLC, Detroit, MI (US)

(72) Inventors: Yao Hu, Sterling Heights, MI (US); Xinyu Du, Oakland Township, MI (US); Binbin Li, College Station, TX (US); Hao Yu, Troy, MI (US); Wende Zhang, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 375 days.

(21) Appl. No.: 17/567,371

(22) Filed: Jan. 3, 2022

(65) Prior Publication Data

US 2023/0215045 A1   Jul. 6, 2023

(51) Int. Cl.
  *G06T 7/73*     (2017.01)
  *B60R 11/04*   (2006.01)
  *G06T 7/80*     (2017.01)
  *G06V 20/58*   (2022.01)

(52) U.S. Cl.
  CPC .............. *G06T 7/80* (2017.01); *G06T 7/73* (2017.01); *G06V 20/58* (2022.01); *B60R 11/04* (2013.01); *G06T 2207/10016* (2013.01); *G06T 2207/30252* (2013.01)

(58) Field of Classification Search
  CPC ... G06T 7/80; G06T 7/73; G06T 2207/10016; G06T 2207/30252; G06V 20/58; B60R 11/04
  See application file for complete search history.

(56) References Cited

U.S. PATENT DOCUMENTS

| | | | |
|---|---|---|---|
| 2006/0208169 A1* | 9/2006 | Breed | B60R 21/01536 250/221 |
| 2008/0292146 A1* | 11/2008 | Breed | B60N 2/002 382/118 |
| 2016/0152263 A1* | 6/2016 | Singh | B60T 8/1708 701/41 |
| 2016/0167669 A1* | 6/2016 | Zhao | B60W 40/06 382/195 |
| 2021/0373138 A1* | 12/2021 | Jiang | G01S 7/4972 |

* cited by examiner

*Primary Examiner* — Shefali D Goradia
*Assistant Examiner* — D J Dhooge
(74) *Attorney, Agent, or Firm* — Quinn IP Law

(57) ABSTRACT

A system for on-vehicle camera alignment monitoring includes an on-vehicle camera in communication with a controller. The controller monitors vehicle operating parameters and camera signal parameters, and captures an image file from the on-vehicle camera. A first level analysis of the image file, the vehicle operating parameters, and the camera signal parameters is executed to detect dynamic conditions and image feature parameters that affect camera alignment. An error with one of the dynamic conditions or the image feature parameters that affects the camera alignment is detected. A second level analysis of the camera signal parameters is executed to identify a root cause indicating one of the dynamic conditions or the image feature parameters that affects the camera alignment based upon the error. A camera alignment-related fault is detected based upon the root cause, and vehicle operation is controlled based upon the camera alignment-related fault.

20 Claims, 9 Drawing Sheets

Daytime

Nightime
*FIG. 5-3*
*FIG. 5-4*
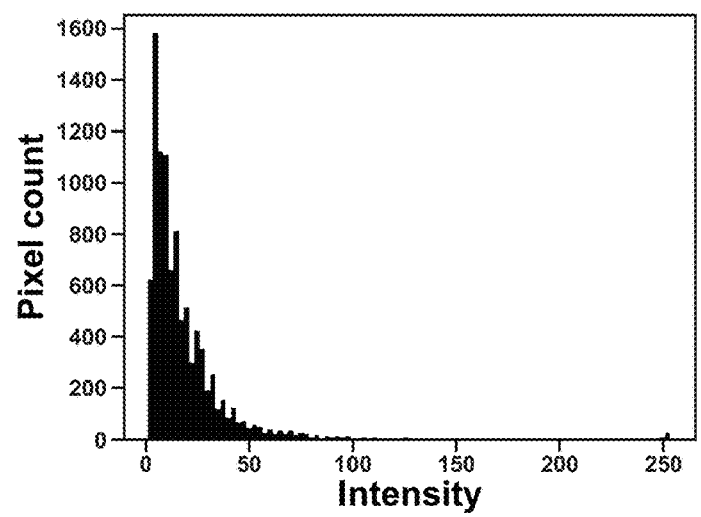
*FIG. 6*

Feature matching results

ON-VEHICLE CAMERA ALIGNMENT MONITORING SYSTEM

Vehicles may include on-board cameras for monitoring an environment proximal to a vehicle during operation, to operate advanced driver assistance systems (ADAS) and/or autonomically-operated vehicle functions. Correct alignment of one or more on-vehicle cameras relative to a reference such as ground is necessary for operation of a bird's eye view imaging system, travel lane sensing, autonomic vehicle control, etc. A set of parameters with six degrees-of-freedom (x, y, z, roll, pitch and yaw) is used to represent the transform from a camera coordinate system to a reference coordinate system. An alignment process runs offline and/or online to determine these parameters. An alignment-related fault of an on-vehicle camera refers to a fault in the alignment process, which may be caused by system hardware issues, data quality issues, system degradation, vibration, an undetected or unwanted mechanical adjustment, etc. Presence of camera alignment-related fault may degrade performance of a spatial monitoring system and an autonomic vehicle control system due to its effect upon camera to ground alignment.

As such, there is a need for a method, system and apparatus to monitor and detect a misalignment of an on-vehicle camera, identify a root cause therefor, and dynamically adjust or otherwise compensate camera alignment in response.

SUMMARY

The concepts described herein provide a vehicle that includes a monitoring system to dynamically detect misalignment of an on-vehicle camera, identify a root cause therefor, and dynamically adjust or otherwise compensate camera alignment in response, including controlling operation of the vehicle based thereon.

In one embodiment, a system for on-vehicle camera alignment monitoring for a vehicle spatial monitoring system is described that includes an on-vehicle camera in communication with a controller. The controller includes an instruction set that is executable to monitor vehicle operating parameters and camera signal parameters, and capture an image file from the on-vehicle camera. A first level analysis of the image file, the vehicle operating parameters, and the camera signal parameters is executed to detect dynamic conditions and a plurality of image feature parameters that affect camera alignment. An error with one of the dynamic conditions or the plurality of image feature parameters that affects the camera alignment is detected. A second level analysis of the camera signal parameters is executed to identify a root cause indicating one of the dynamic conditions or the image feature parameters that affects the camera alignment based upon the error. A camera alignment-related fault is detected based upon the root cause, and vehicle operation is controlled, adapted, disabled or otherwise mitigated based upon the camera alignment-related fault.

An aspect of the disclosure includes the dynamic conditions including vehicle speed, acceleration and yaw rate, and wherein the instruction set is executable to detect the error when one of the vehicle speed, the acceleration, or the yaw rate is outside a respective allowable range based upon the dynamic conditions.

Another aspect of the disclosure includes the dynamic conditions being a road surface, and wherein the instruction set is executable to detect the error when an uneven road surface is detected.

Another aspect of the disclosure includes the plurality of image feature parameters being at least one of a feature extraction count, a feature match count, an essential matrix inlier point count, a recovering pose feature count, a triangulation inlier point count, a two-dimensional road region of interest (ROI) feature point count, a three-dimensional road ROI feature point count, and a plane-fitting inlier point count.

Another aspect of the disclosure includes the instruction set being executable to detect the error when the one of the plurality of image feature parameters is outside a respective allowable range.

Another aspect of the disclosure includes the instruction set being executable to identify one of an insufficient lighting condition, a lens blockage, or an inclement weather condition when one of the plurality of image feature parameters is outside a respective allowable range.

Another aspect of the disclosure includes the instruction set being executable to capture a plurality of consecutive image files from the on-vehicle camera, determine a plurality of matched feature pairs between the plurality of consecutive image files, determine a plurality of motion vectors based upon the plurality of matched feature pairs, and detect an error with the plurality of motion vectors that affects the camera alignment. The second level analysis of the camera signal parameters is executed to identify the root cause of the error with the plurality of motion vectors that affects the camera alignment; wherein the root cause of the error with the plurality of motion vectors that affects the camera alignment includes a fault with mounting of the on-vehicle camera.

Another aspect of the disclosure includes the instruction set being executable to detect a camera alignment-related fault based upon the root cause of the error with the plurality of motion vectors that affects the camera alignment, and control, adapt, disable or otherwise mitigate vehicle operation based upon the camera alignment-related fault.

Another aspect of the disclosure includes the instruction set being executable to cluster the plurality of motion vectors to determine inlier points in an essential matrix calculation, a triangulation and plane fitting; and identify an insufficient quantity of inlier points based thereon.

Another aspect of the disclosure includes the instruction set being executable to control, adapt, disable or otherwise mitigate vehicle operation based upon the camera alignment-related fault by notifying a vehicle operator of the camera alignment-related fault.

Another aspect of the disclosure includes an autonomic vehicle control system operatively connected to the vehicle spatial monitoring system; wherein the instruction set is executable to disable the autonomic vehicle control system based upon the camera alignment-related fault.

Another aspect of the disclosure includes communicating the image file, the vehicle operating parameters, the camera signal parameters, and the plurality of image feature parameters to an off-board system.

Another aspect of the disclosure includes a system for on-vehicle camera alignment monitoring that includes a vehicle spatial monitoring system having an on-vehicle camera in communication with a controller. The controller includes an instruction set that is executable to monitor vehicle operating parameters and camera signal parameters, capture a plurality of image files from the on-vehicle camera, and analyze the plurality of image files, the vehicle operating parameters, and the camera signal parameters to detect dynamic conditions, a plurality of image feature parameters, and a plurality of motion vectors that affect camera alignment. An error with one of the dynamic conditions, the plurality of image feature parameters, and the plurality of motion vectors that affects the camera alignment is detected. The camera signal parameters are analyzed to identify a root cause indicating one of the dynamic conditions, the image feature parameters, or the plurality of motion vectors that affects the camera alignment based upon the error. A camera alignment-related fault is detected based upon the root cause. Vehicle operation is controlled, adapted, disabled or otherwise mitigated based upon the camera alignment-related fault.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIGS. 4-1 through 4-5 schematically illustrate a plurality of subroutines of the second level analysis routine for on-vehicle camera alignment monitoring, in accordance with the disclosure.

FIG. 5-1 pictorially illustrates a raw camera image of a ROI captured in daylight, in accordance with the disclosure.

FIG. 5-2 schematically illustrates a bar graph of pixel intensity distribution for the raw camera image of FIG. 5-1, in accordance with the disclosure.

FIG. 5-3 pictorially illustrates a raw camera image of the same ROI as shown in FIG. 5-1 captured at night, in accordance with the disclosure.

FIG. 5-4 schematically illustrates a bar graph of pixel intensity distribution for the raw camera image of FIG. 5-3, in accordance with the disclosure.

FIG. 6 pictorially illustrates a raw camera image of a region of interest (ROI) in which a portion of the ROI is overshadowed by a blockage, in accordance with the disclosure.

FIG. 7-1 pictorially illustrates a raw image of a ROI of the camera with a multiplicity of feature pairs indicated, in accordance with the disclosure.

FIG. 7-2 schematically illustrates, in 3D space, clusters of the multiplicity of feature pairs shown with reference to FIG. 7-1, in accordance with the disclosure.

FIG. 8-1 pictorially illustrates a raw image of a ROI of the camera including a dynamic object, and a multiplicity of feature pairs indicated, in accordance with the disclosure.

FIG. 8-2 schematically illustrates, in 3D space, clusters of the multiplicity of feature pairs shown with reference to FIG. 8-1, in accordance with the disclosure.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

Figure 1:
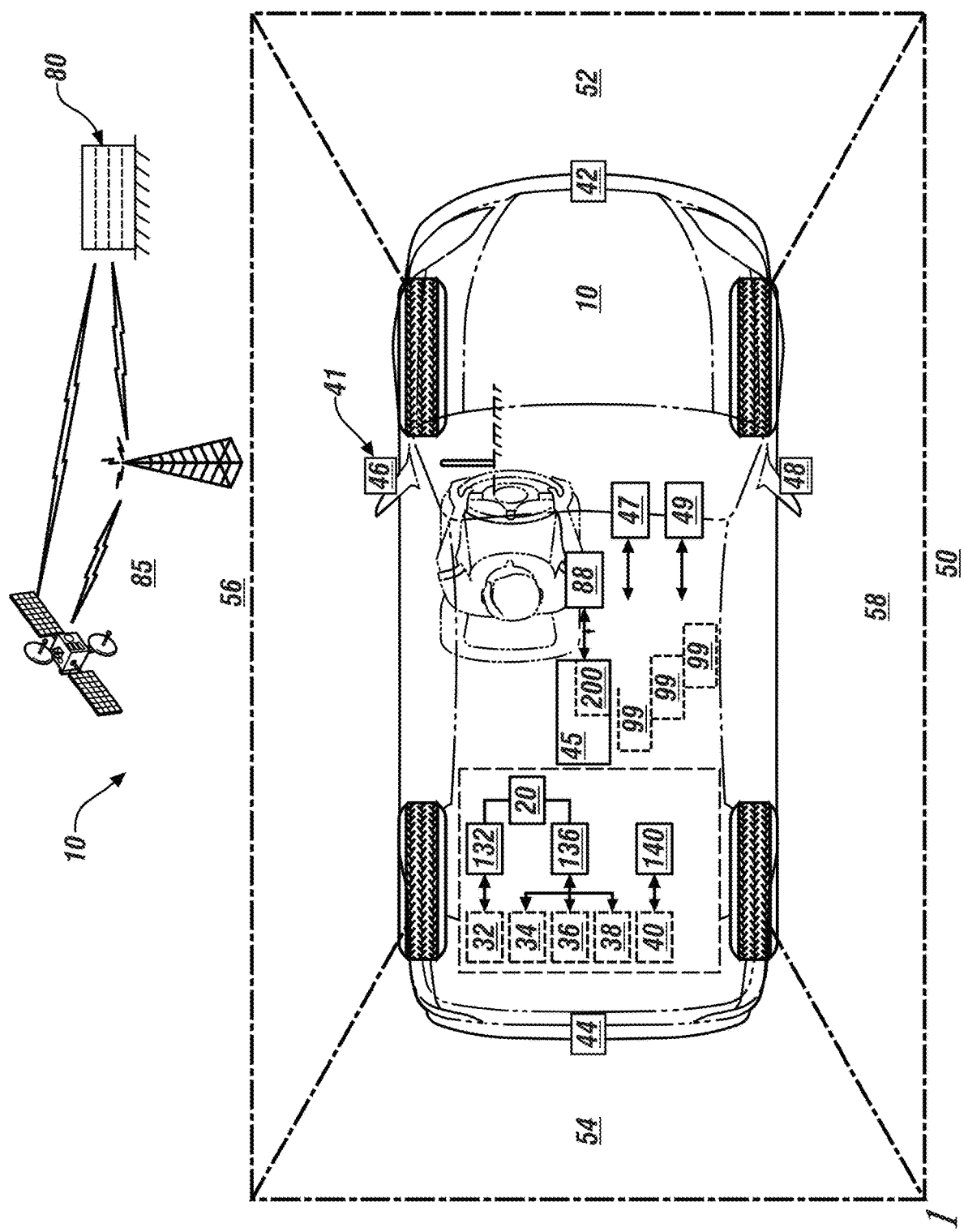
FIG. 1 schematically shows a vehicle including a spatial monitoring system and an autonomic vehicle control system, in accordance with the disclosure.

Referring to the drawings, wherein like reference numerals correspond to like or similar components throughout the several Figures, FIG. 1, consistent with embodiments disclosed herein, illustrates a top view of a vehicle 10 disposed on a ground surface 50 and having a vehicle spatial monitoring system 40 that is illustrative of the concepts described herein. In one embodiment, the vehicle 10 also includes an autonomic vehicle control system 20. The vehicle 10 may include, in one embodiment, a four-wheel passenger vehicle with steerable front wheels and fixed rear wheels. The vehicle 10 may include, by way of non-limiting examples, a passenger vehicle, a light-duty or heavy-duty truck, a utility vehicle, an agricultural vehicle, an industrial/warehouse vehicle, or a recreational off-road vehicle.

The vehicle spatial monitoring system 40 and spatial monitoring controller 140 can include a controller that communicates with a plurality of cameras 41 to monitor fields of view proximal to the vehicle 10 and generate digital representations of the fields of view including proximate remote objects.

The spatial monitoring controller 140 can evaluate inputs from the cameras 41 to determine a linear range, relative speed, and trajectory of the vehicle 10 in relation to each proximate remote object.

The cameras 41 are located at various locations on the vehicle 10, and include a front camera 42 capable of viewing a forward region of interest (ROI) 52, a rear camera 44 capable of viewing a rearward ROI 54, a left camera 46 capable of viewing a leftward ROI 56, and a right camera 48 capable of viewing a rightward ROI 58. The front camera 42, rear camera 44, left camera 46 and right camera 48 are capable of capturing and pixelating 2D images of their respective ROIs. The front camera 42, rear camera 44, left camera 46 and right camera 48 may utilize fish-eye lenses to maximize the reach of their respective ROIs.

Placement of the aforementioned cameras 41 permits the spatial monitoring controller 140 to monitor traffic flow including proximate vehicles, other objects around the vehicle 10, and the ground surface 50. Data generated by the spatial monitoring controller 140 may be employed by a lane mark detection processor (not shown) to estimate the roadway. The cameras 41 of the vehicle spatial monitoring system 40 can further include object-locating sensing devices including range sensors, such as FM-CW (Frequency Modulated Continuous Wave) radars, pulse and FSK (Frequency Shift Keying) radars, and Lidar (Light Detection and Ranging) devices, and ultrasonic devices which rely upon effects such as Doppler-effect measurements to locate forward objects. The possible object-locating devices include charged-coupled devices (CCD) or complementary metal oxide semi-conductor (CMOS) video image sensors, and other camera/video image processors which utilize digital photographic methods to 'view' forward objects including one or more proximal vehicle(s). Such sensing systems are employed for detecting and locating objects in automotive applications and are useable with systems including, e.g., adaptive cruise control, autonomous braking, autonomous steering and side-object detection.

The cameras 41 associated with the vehicle spatial monitoring system 40 are preferably positioned within the vehicle 10 in relatively unobstructed positions to monitor the spatial environment. As employed herein, the spatial environment includes all external elements, including fixed objects such as signs, poles, trees, houses, stores, bridges, etc., and moving or moveable objects such as pedestrians and other vehicles. Overlapping coverage areas of the cameras 41 create opportunities for sensor data fusion.

The autonomic vehicle control system 20 includes an on-vehicle control system that is capable of providing a level of driving automation, e.g., an advanced driver assistance system (ADAS). The terms driver and operator describe the person responsible for directing operation of the vehicle, whether actively involved in controlling one or more vehicle functions or directing autonomous vehicle operation. Driving automation can include a range of dynamic driving and vehicle operation. Driving automation can include some level of automatic control or intervention related to a single vehicle function, such as steering, acceleration, and/or braking, with the driver continuously having overall control of the vehicle. Driving automation can include some level of automatic control or intervention related to simultaneous control of multiple vehicle functions, such as steering, acceleration, and/or braking, with the driver continuously having overall control of the vehicle. Driving automation can include simultaneous automatic control of all vehicle driving functions, including steering, acceleration, and braking, wherein the driver cedes control of the vehicle for a period of time during a trip. Driving automation can include simultaneous automatic control of vehicle driving functions, including steering, acceleration, and braking, wherein the driver cedes control of the vehicle for an entire trip. Driving automation includes hardware and controllers configured to monitor a spatial environment under various driving modes to perform various driving tasks during dynamic operation. Driving automation can include, by way of non-limiting examples, cruise control, adaptive cruise control, lane-change warning, intervention and control, automatic parking, acceleration, braking, and the like.

The vehicle systems, subsystems and controllers associated with the autonomic vehicle control system 20 are implemented to execute one or a plurality of operations associated with autonomous vehicle functions, including, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc. The vehicle systems and associated controllers of the autonomic vehicle control system 20 can include, by way of non-limiting examples, a drivetrain 32 and drivetrain controller (PCM) 132 that is operatively connected to one or more of a steering system 34, a braking system 36, and a chassis system 38.

Each of the vehicle systems and associated controllers may further include one or more subsystems and one or more associated controllers. The subsystems and controllers are shown as discrete elements for ease of description. The foregoing classification of the subsystems is provided for purposes of describing one embodiment, and is illustrative. Other configurations may be considered within the scope of this disclosure. It should be appreciated that the functions described and performed by the discrete elements may be executed using one or more devices that may include algorithmic code, calibrations, hardware, application-specific integrated circuitry (ASIC), and/or off-board or cloud-based computing systems.

The vehicle 10 has a telematics device 88, which includes a wireless telematics communication system capable of extra-vehicle communications, including communicating with a communication network system having wireless and wired communication capabilities. The telematics device 88 is capable of extra-vehicle communications that includes short-range ad hoc vehicle-to-vehicle (V2V) communication and/or vehicle-to-everything (V2x) communication, which may include communication with an infrastructure monitor, e.g., a traffic camera and ad hoc vehicle communication. Alternatively, or in addition, the telematics device 88 has a wireless telematics communication system capable of short-range wireless communication to a handheld device, e.g., a cell phone, a satellite phone or another telephonic device. In one embodiment, the handheld device executes the extra-vehicle communication, including communicating with an off-board server 80 via a communication network 85 including a satellite, an antenna, and/or another communication mode. Alternatively, or in addition, the telematics device 88 executes the extra-vehicle communication directly by communicating with the off-board server 80 via a communication network 90. In one embodiment, the off-board server 80 is cloud-based.

A vehicle controller (PCM) 132 communicates with and is operatively connected to the drivetrain 32, and executes control routines to control operation of an engine and/or other torque machines, a transmission and a driveline, none of which are shown, to transmit tractive torque to the vehicle wheels in response to driver inputs, external conditions, and vehicle operating conditions. The PCM 132 is shown as a single controller, but can include a plurality of controller devices operative to control various powertrain actuators, including the engine, transmission, torque machines, wheel motors, and other elements of the drivetrain 32. By way of a non-limiting example, the drivetrain 32 can include an internal combustion engine and transmission, with an associated engine controller and transmission controller. Furthermore, the internal combustion engine may include a plurality of discrete subsystems with individual controllers, including, e.g., an electronic throttle device and controller, fuel injectors and controller, etc. The drivetrain 32 may also be composed of an electrically-powered motor/generator with an associated power inverter module and inverter controller. The control routines of the PCM 132 may also include an adaptive cruise control system (ACC) that controls vehicle speed, acceleration and braking in response to driver inputs and/or autonomous vehicle control inputs.

A VCM 136 communicates with and is operatively connected to a plurality of vehicle operating systems and executes control routines to control operation thereof. The vehicle operating systems can include braking, stability control, and steering, which can be controlled by actuators associated with the braking system 36, the chassis system 38 and the steering system 34, respectively, which are controlled by the VCM 136. The VCM 136 is shown as a single controller, but can include a plurality of controller devices operative to monitor systems and control various vehicle actuators.

The steering system 34 is configured to control vehicle lateral motion. The steering system 34 can include an electrical power steering system (EPS) coupled with an active front steering system to augment or supplant operator input through a steering wheel by controlling steering angle of the steerable wheels of the vehicle 10 during execution of an autonomic maneuver such as a lane change maneuver. An exemplary active front steering system permits primary steering operation by the vehicle driver including augmenting steering wheel angle control to achieve a desired steering angle and/or vehicle yaw angle. Alternatively or in addition, the active front steering system can provide complete autonomous control of the vehicle steering function. It is appreciated that the systems described herein are applicable with modifications to vehicle steering control systems such as electrical power steering, four/rear wheel steering systems, and direct yaw control systems that control traction of each wheel to generate a yaw motion.

The braking system 36 is configured to control vehicle braking, and includes wheel brake devices, e.g., disc-brake elements, calipers, master cylinders, and a braking actuator, e.g., a pedal. Wheel speed sensors monitor individual wheel speeds, and a braking controller can be mechanized to include anti-lock braking functionality.

The chassis system 38 preferably includes a plurality of on-board sensing systems and devices for monitoring vehicle operation to determine vehicle motion states, and, in one embodiment, a plurality of devices for dynamically controlling a vehicle suspension. The vehicle motion states preferably include, e.g., vehicle speed, steering angle of the steerable front wheels, and yaw rate. The on-board sensing systems and devices include inertial sensors, such as rate gyros and accelerometers, and collectively referred to as an inertial monitoring unit (IMU) 47. The IMU 47 measures and reports specific force, angular rate, and sometimes the orientation of the vehicle, collectively referred to as roll, pitch and yaw. The vehicle 10 also includes a global position system (GPS) sensor 49. The chassis system 38 estimates the vehicle motion states, such as longitudinal speed, yaw-rate and lateral speed, and estimates lateral offset and heading angle of the vehicle 10. The measured yaw rate is combined with steering angle measurements to estimate the vehicle state of lateral speed. The longitudinal speed may be determined based upon signal inputs from wheel speed sensors arranged to monitor each of the front wheels and rear wheels. Signals associated with the vehicle motion states that can be communicated to and monitored by other vehicle control systems for vehicle control and operation.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine-readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. The term 'model' refers to a processor-based or processor-executable code and associated calibration that simulates a physical existence of a device or a physical process. The terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

Figure 2:
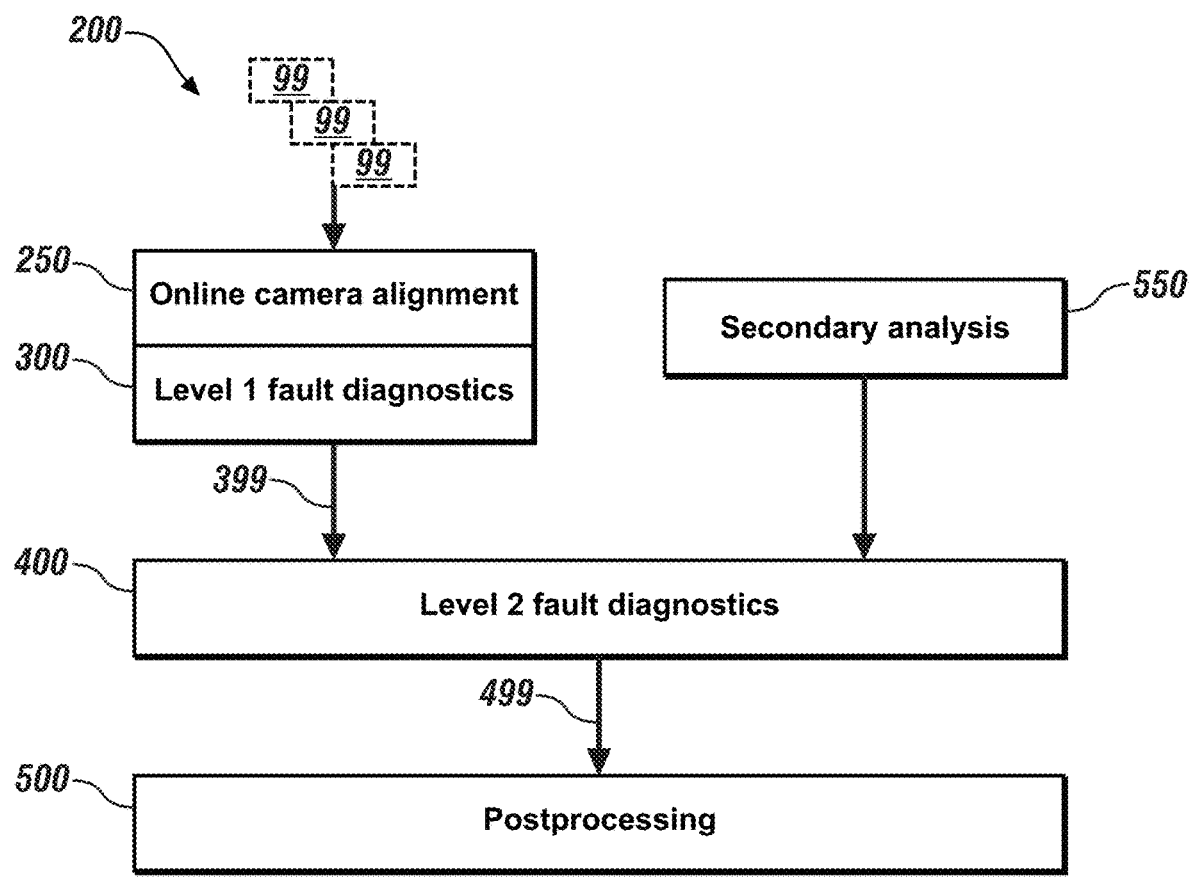
FIG. 2 schematically illustrates an architecture for a system for on-vehicle camera alignment monitoring, in accordance with the disclosure.

Referring now to FIG. 2, the concepts described herein provide a system, method, and/or apparatus 200 to monitor alignment of the camera 41, e.g., one of a front camera 42, rear camera 44, left camera 46 or right camera 48 of an embodiment of the vehicle 10 and spatial monitoring system 40 that are described with reference to FIG. 1.

As described with reference to FIG. 2, an architecture for the system 200 for on-vehicle camera alignment monitoring includes the camera 41 in communication with controller 45. The controller 45 has an instruction set that is executable to monitor vehicle operating parameters and camera signal parameters and capture an image file 99 therefrom. The architecture for the system 200 includes an adaptive camera alignment routine (Online camera alignment) 250, a first level analysis routine (Level 1 fault diagnostics) 300 for on-vehicle camera alignment monitoring, a second level analysis routine (Level 2 fault diagnostics) 400 for on-vehicle camera alignment monitoring, and a post-processing analysis routine (Postprocessing) 500, and a secondary analysis routine (Secondary analysis) 550 for on-vehicle camera alignment monitoring.

The adaptive camera alignment routine 250 is an internally executed control routine that dynamically monitors and adjusts alignment of the camera 41 based upon known reference points.

The first level analysis routine 300 executes an analysis of an image file 99 in context of vehicle operating parameters and camera signal parameters to detect dynamic conditions, image feature parameters, and a motion vector that may affect camera alignment, may indicate camera alignment-related fault, or may preclude further analysis due to other factors related to the dynamic conditions, the image feature parameters, and the motion vector. The first level analysis routine 300 is described in detail with reference to FIG. 3. An error 399 associated with one of the dynamic conditions, the image feature parameters, and the motion vector that affects the camera alignment is identified.

The second level analysis routine 400 is executed to identify a root cause 499 associated with the one of the dynamic conditions, the image feature parameters, and the motion vector that affects the camera alignment based upon the error 399 and, in some cases, information from the secondary analysis routine 550. The second level analysis routine 400 is described in detail with reference to FIGS. 4-1 through 4-5. A camera alignment-related fault is detected based upon the second level analysis. The post-processing analysis routine 500 executes post-processing steps to control, adapt, disable or otherwise mitigate vehicle operation and perform other steps based upon the camera alignment-related fault.

Figure 3:
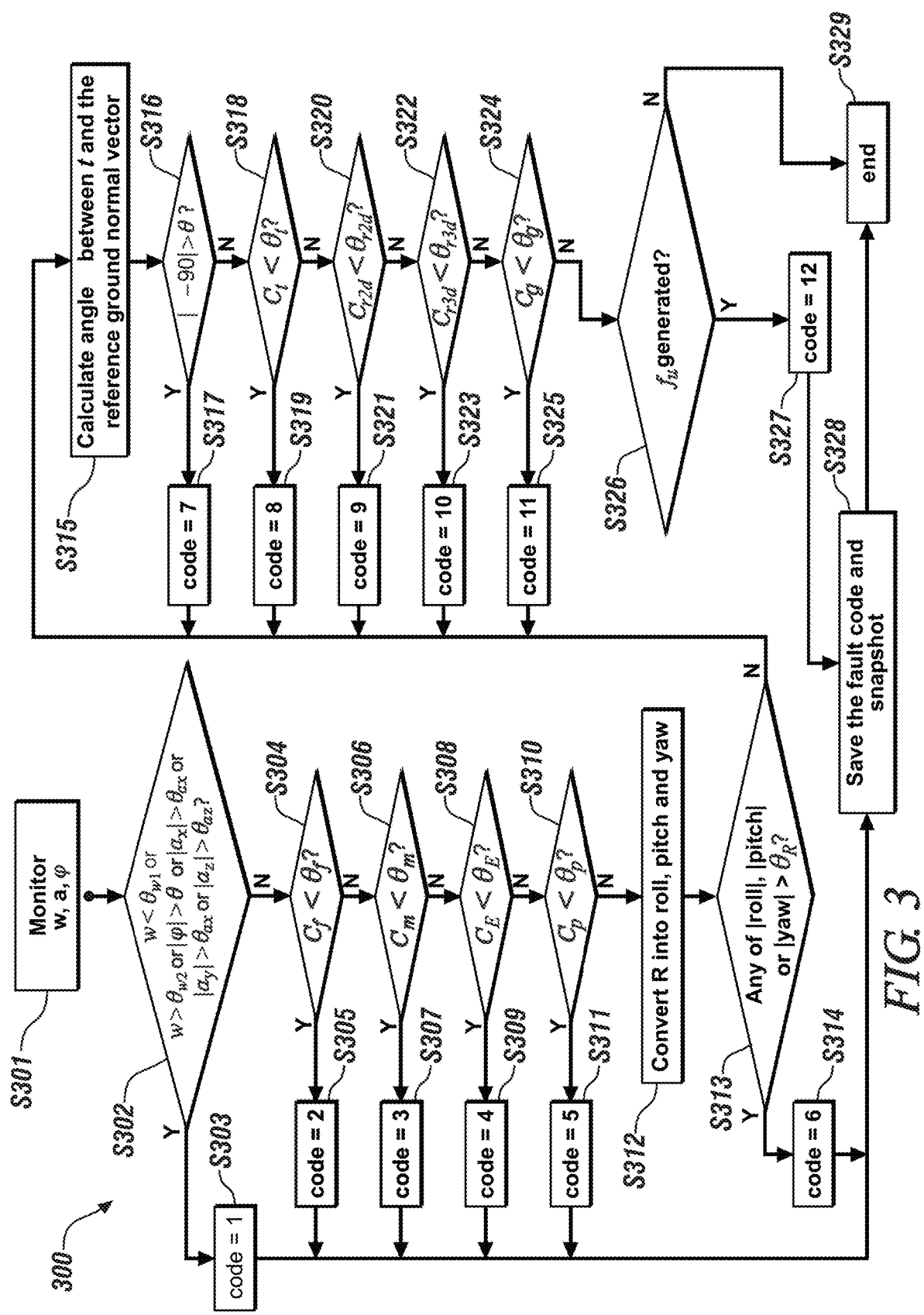
FIG. 3 schematically illustrates a first level analysis routine for on-vehicle camera alignment monitoring, in accordance with the disclosure.

Referring now to FIG. 3, with continued reference to the vehicle 10 described with reference to FIG. 1, the first level analysis routine 300 for on-vehicle camera alignment monitoring is depicted as an algorithmic flowchart and is described in detail. Execution of the first level analysis routine 300 may proceed as follows during operation of the vehicle 10. The steps of the first level analysis routine 300 may be executed in a suitable order, and are not limited to the order described with reference to FIG. 3. As employed herein, the term "Y" indicates an answer in the affirmative, or "YES", and the term "N" indicates an answer in the negative, or "NO".

A fault in the alignment process may be due to violation of one or more test enable criteria. Test enable criteria need to be met before a substantive alignment process is executed in response to occurrence of misalignment of a respective one of the cameras 41. The test enable criteria include monitoring and evaluating vehicle operating parameters. The vehicle operating parameters of speed (w), acceleration (a), and yaw rate ($\varphi$) are monitored (S301), and evaluated (S302). When the speed is outside of an allowable speed range (w<$\theta_{w1}$, or w>$\theta_{w2}$), or the yaw rate is greater than an allowable yaw rate ($|\varphi|>\theta_\alpha$), or vehicle acceleration in any of the x, y, or z directions is greater than corresponding allowable accelerations ($|\alpha_x|>\theta_{ax}$, $|\alpha_y|>\theta_{ay}$ or $|\alpha_z|>\theta_{az}$), (S302)(Y), a first fault code is set (S303) indicating that dynamic vehicle conditions are violated. The first fault code and associated image file 99 are captured in a memory device (S328) and this iteration ends (S329).

Image feature parameters include features that may be extracted, derived, or otherwise determined from each image file 99, and may include one or more of a feature extraction count $c_f$, a feature match count $c_m$, an essential matrix inlier point count $c_E$, a recovering pose feature count $c_p$, triangulation inlier point count $c_t$, a two-dimensional road ROI feature point count $C_{r2d}$, a three-dimensional road ROI feature point count $C_{r3d}$, and a plane-fitting inlier point count $C_g$. These features and counts may be generated by the alignment routine 250, and consequently reused in routines 300, 400 and 500. The first level analysis routine 300 detects an error with one of the plurality of image feature parameters when the one of the plurality of image feature parameters is outside a respective allowable range. This operation is described with reference to Steps S304 through S325.

Otherwise (S302)(N), a feature extraction count $c_f$ for the image file 99 is compared to a minimum permissible feature extraction count $\theta_f$ (S304). When the feature count is less than the minimum permissible feature extraction count $\theta_f$ ($c_f<\theta_f$) (S304)(Y), a second fault code is set (S305) indicating that the feature extraction count is too low. The second fault code and associated image file 99 are captured in a memory device (S328) and this iteration ends (S329).

Otherwise (S304)(N), a feature match count $c_m$ for the image file 99 is compared to a minimum permissible feature match count $\theta_m$ (S306). When the feature match count is less than the minimum permissible feature match count $\theta_m$ ($c_m<\theta_m$) (S306)(Y), a third fault code is set (S307) indicating that the feature match count is too low. The third fault code and associated image file 99 are captured in a memory device (S328) and this iteration ends (S329).

Otherwise (S306)(N), an essential matrix inlier point count $c_E$ for the image file 99 is compared to an essential matrix inlier point count $\theta_E$ (S308). When the essential matrix inlier point count is less than the essential matrix inlier point count $\theta_E$ ($c_E<\theta_E$) (S308)(Y), a fourth fault code is set (S309) indicating that the essential matrix inlier point count $c_E$ is too low. The fourth fault code and associated image file 99 are captured in a memory device (S328) and this iteration ends (S329).

Otherwise (S308)(N), a recovering pose feature count $c_p$ for the image file 99 is compared to a minimum recovering pose feature count $\theta_p$ (S310). When the recovering pose feature count is less than the minimum permissible recovering pose feature count $\theta_p$ ($c_f>\theta_f$) (S310)(Y), a fifth fault code is set (S311) indicating that the recovering pose feature count is too low. The fifth fault code and associated image file 99 are captured in a memory device (S328) and this iteration ends (S329).

A derived rotation matrix R is converted to values for roll, pitch and yaw of the vehicle (S312), which are compared to threshold values for roll, pitch, and yaw $\theta_R$ (S313). When any of the roll, pitch and yaw of the vehicle (S312) are greater than the respective threshold values for roll, pitch, and yaw $\theta_R$ (S313)(Y), a sixth fault code is set (S314) indicating that the roll, pitch and/or yaw of the vehicle is too great. The sixth fault code and associated image file 99 are captured in a memory device (S328) and this iteration ends (S329).

An angle $\beta$ is determined between a translation vector t and a reference ground normal vector (S315). The angle $\beta$ is normalized ($|\beta-90|$) and compared to a maximum threshold angle $\theta_\beta$. When the normalized angle is greater than the maximum threshold angle $\theta_\beta$ (S316)(Y), a seventh fault code is set (S317) indicating that the angle $\theta_\beta$ is too great. The seventh fault code and associated image file 99 are captured in a memory device (S328) and this iteration ends (S329).

A triangulation inlier point count $c_t$ is determined (S318). The triangulation inlier point count $c_t$ is compared to a minimum threshold triangulation inlier point count $\theta_t$. When the triangulation inlier point count $c_t$ is less than the minimum triangulation inlier point count $\theta_t$ (S318)(Y), an eighth fault code is set (S319) indicating that the triangulation inlier point count $c_t$ is too small. The eighth fault code and associated image file 99 are captured in a memory device (S328) and this iteration ends (S329).

A two-dimensional road ROI feature point count $C_{r2d}$ is determined (S320). The two-dimensional road ROI feature point count $C_{r2d}$ is compared to a minimum two-dimensional road ROI feature point count $\theta_{r2d}$. When the two-dimensional road ROI feature point count $C_{r2d}$ is less than the minimum two-dimensional road ROI feature point count $\theta_{r2d}$ (S320)(Y), a ninth fault code is set (S321) indicating that the two-dimensional road ROI feature point count Cad is too small. The ninth fault code and associated image file 99 are captured in a memory device (S328) and this iteration ends (S329).

A three-dimensional road ROI feature point count $C_{r3d}$ is determined (S322). The three-dimensional road ROI feature point count $C_{r3d}$ is compared to a minimum three-dimensional road ROI feature point count $\theta_{r3d}$. When the three-dimensional road ROI feature point count $C_{r3a}$ is less than the minimum three-dimensional road ROI feature point count $\theta_{r2d}$ (S322)(Y), a tenth fault code is set (S323) indicating that the three-dimensional road ROI feature point count $C_{r3d}$ is too small. The tenth fault code and associated image file 99 are captured in a memory device (S328) and this iteration ends (S329).

A plane-fitting inlier point count $C_g$ is determined (S324). The plane-fitting inlier point count $C_g$ is compared to a minimum plane-fitting inlier point count $\theta_g$. When the plane-fitting inlier point count $C_g$ is less than the minimum plane-fitting inlier point count $\theta_g$ (S324)(Y), an eleventh fault code is set (S325) indicating that the plane-fitting inlier point count $C_g$ is too small. The eleventh fault code and associated image file 99 are captured in a memory device (S328) and this iteration ends (S329).

An uneven road surface flag $f_u$ is evaluated (S326). When the uneven road surface flag $f_u$ has been set, indicating an uneven road surface (S326)(Y), a twelfth fault code is set (S327). The twelfth fault code and associated image file 99 are captured in a memory device (S328) and this iteration ends (S329).

At this point, this iteration of the first level analysis routine 300 ends (S329).

Figures 1, 4:
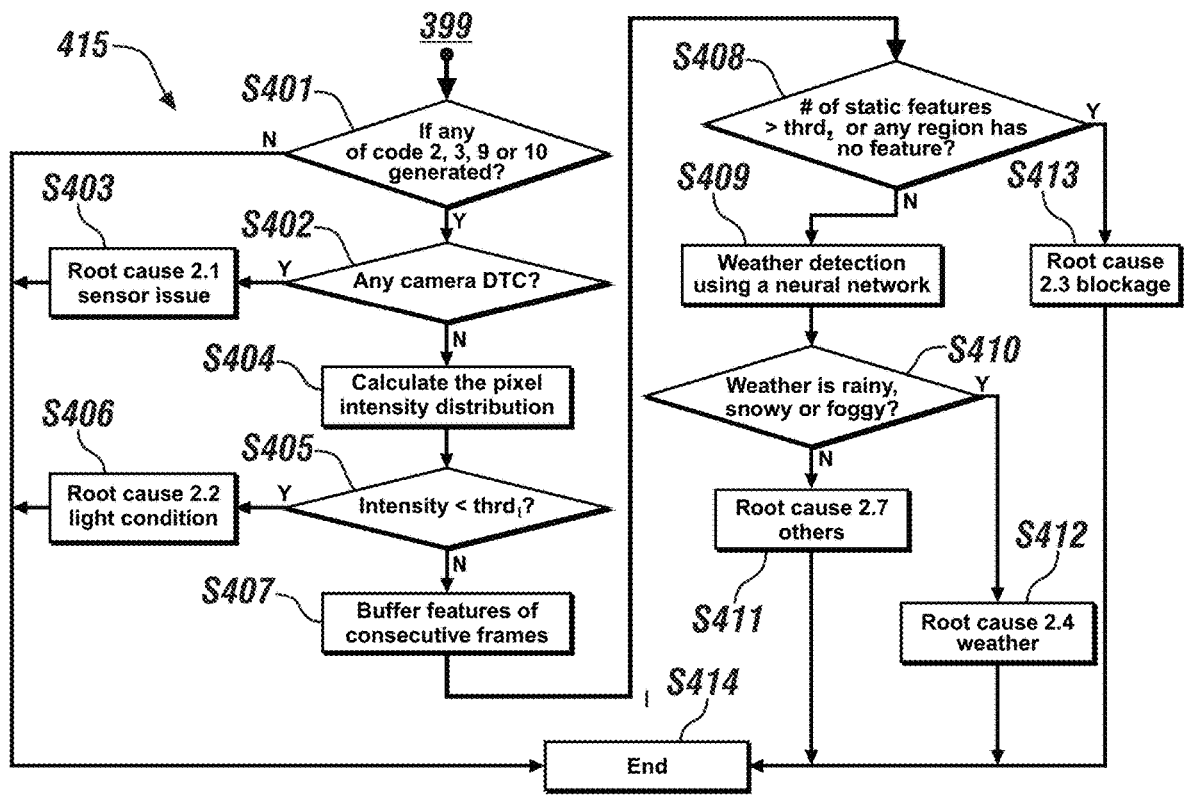
Figures 2, 4:
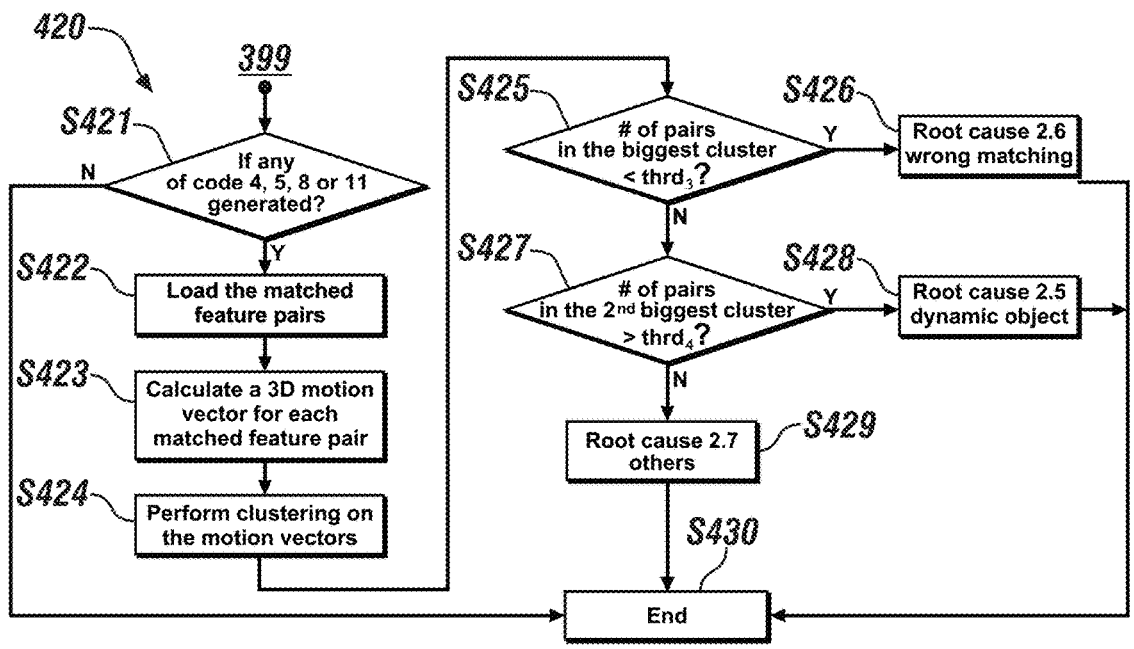
Figures 3, 4:
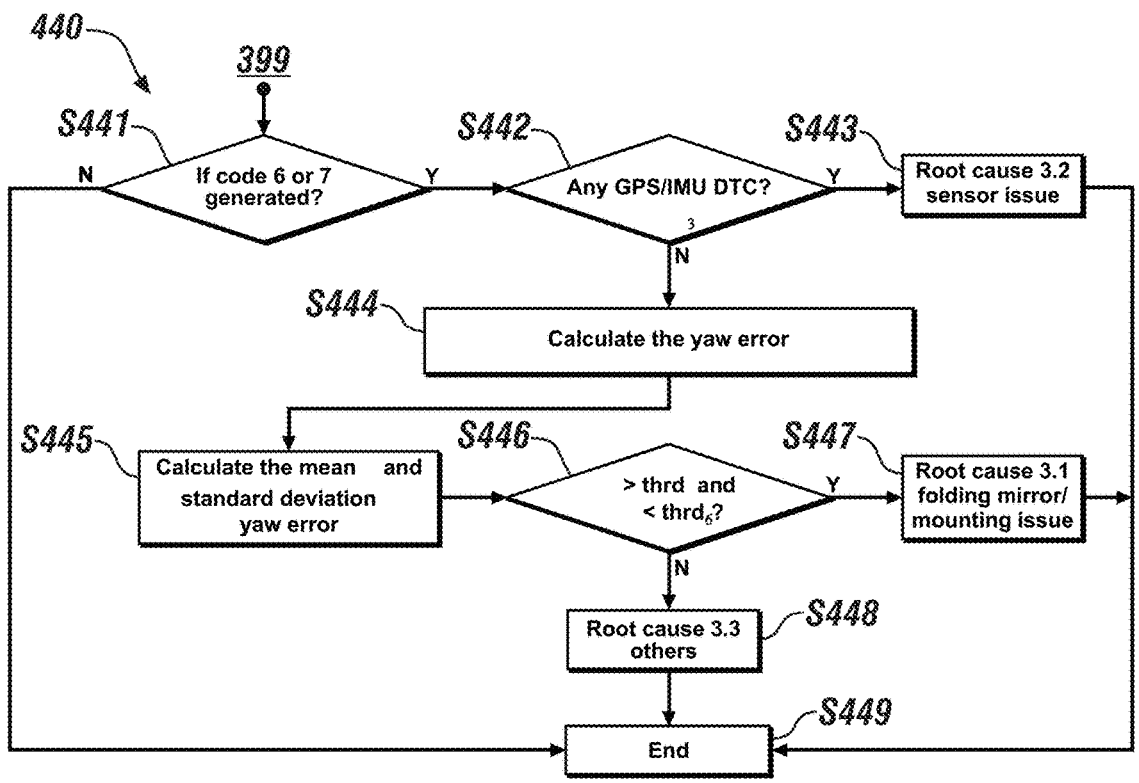
Figure 4:
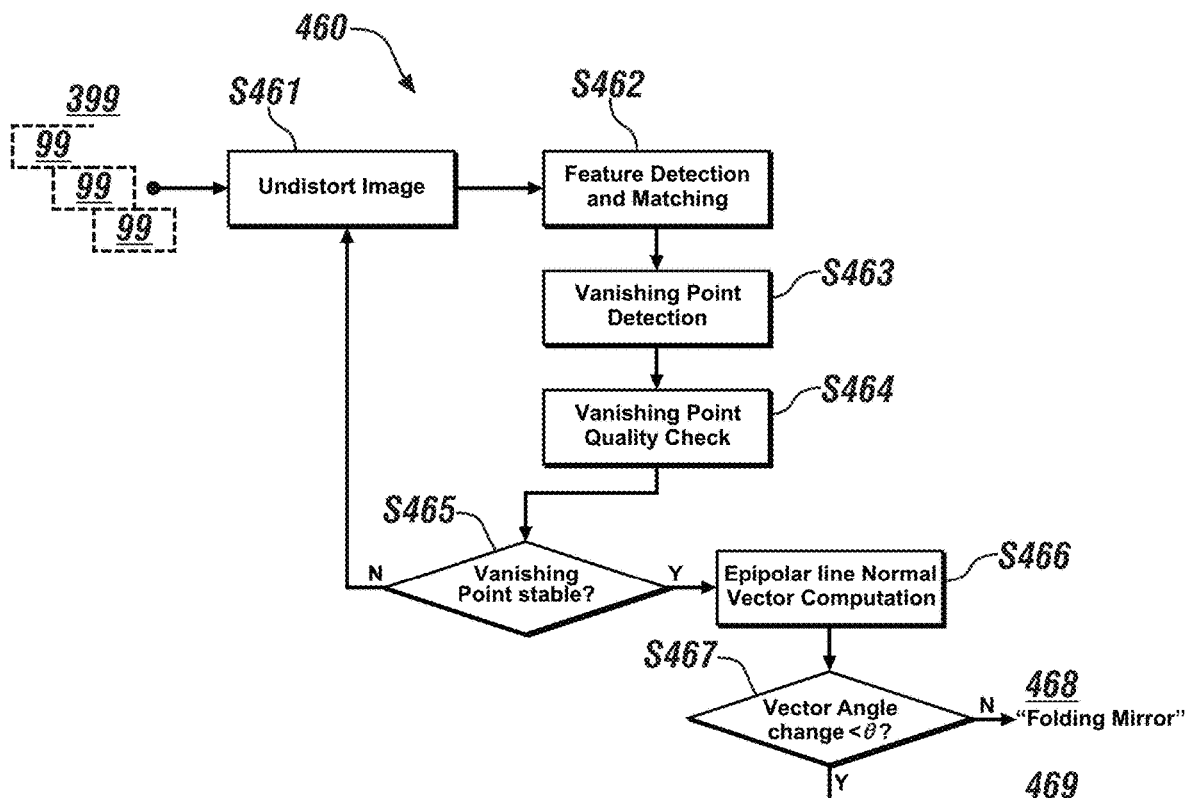
Figures 4, 5:
Figures 1, 5:
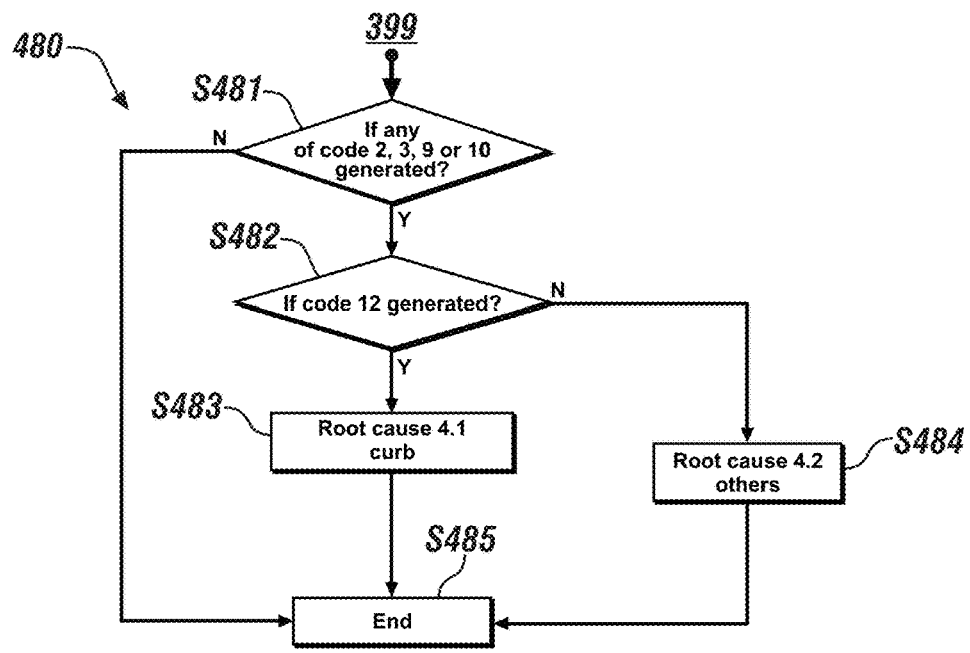
Figures 2, 5:
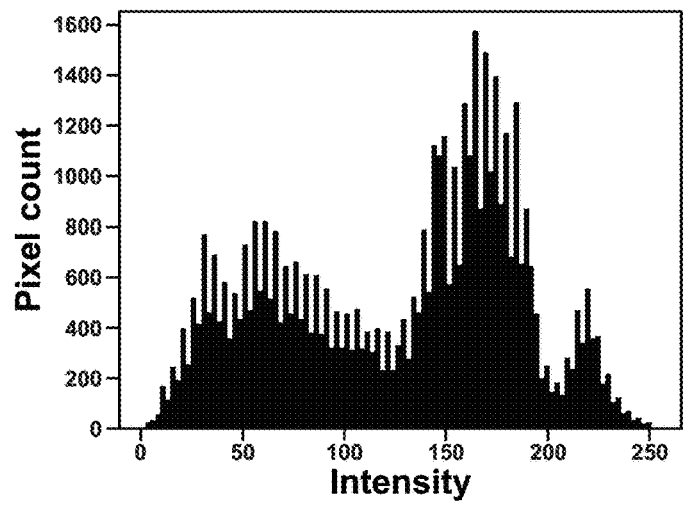

Referring now to FIGS. 4-1 through 4-5, with continued reference to the vehicle 10 described with reference to FIG. 1, the second level analysis routine 400 is depicted as an algorithmic flowchart, and is described in detail. to identify a root cause associated with the one of the dynamic conditions, the image feature parameters, and the motion vector that affects the camera alignment based upon the error 399 and, in some cases, information from the secondary analysis routine 550. The second level analysis routine 400 is described in detail with reference to FIGS. 4-1 through 4-5.

FIG. 4-1 schematically illustrates a first subroutine 415 of the second level analysis routine 400 for on-vehicle camera alignment monitoring, which provides root cause analysis when the faults indicate there are insufficient features for analysis, i.e., the second, third, ninth and tenth fault codes.

Upon initiation, the first subroutine 415 evaluates the fault code (S401). When none of the second, third, ninth and tenth fault codes is indicated (S401)(N), this iteration ends (S414), and advances to the second subroutine 420.

When one of the second, third, ninth and tenth fault codes is indicated (S401)(Y), it is evaluated whether a fault related to the camera 41 has been detected (S402), and if so (Y), the root cause is indicated to be a fault with the camera (S403), and this iteration ends (S414).

Otherwise (S402)(N), a pixel intensity distribution for the image 99 is calculated (S404) and evaluated (Intensity<$thrd_1$) (S405). When the pixel intensity distribution for the image 99 is less than the first threshold $thrd_1$ (S405)(Y), the root cause is indicated to be insufficient ambient lighting (S406), and this iteration ends (S414).

FIGS. 5-1 and 5-3 pictorially illustrate raw camera images, with FIG. 5-1 showing a first raw camera image that is captured under sunlight, and FIG. 5-3 showing a first raw camera image for the same location and direction of vehicle operation that is captured at night, i.e., absent ambient sunlight. FIG. 5-2 illustrates, in bar graph form, pixel intensity distribution with pixel count shown in relation to intensity for the raw camera image of FIG. 5-1, i.e., during daylight. FIG. 5-4 illustrates, in bar graph form, pixel intensity distribution with pixel count shown in relation to intensity for the raw camera image of FIG. 5-3, i.e., at night. The pixel intensity distribution of FIG. 5-2 is sufficient for analysis of the on-vehicle camera alignment, but the pixel intensity distribution of FIG. 5-4 is insufficient for analysis of the on-vehicle camera alignment.

Otherwise (S405)(Y), features from consecutive ones of the image files 99 are buffered (S407).

The quantity of static features of the buffered consecutive ones of the image files 99 is evaluated, including evaluating portions of the buffered consecutive ones of the image files 99 for presence or absence of features (S408). When the quantity of static features of the buffered consecutive ones of the image files 99 is greater than a second threshold ($thrd_2$), or if a portion of the buffered consecutive ones of the image files 99 has no features (S408)(Y), the root cause is indicated to be a lens blockage, such as dirt, debris, etc. (S413), and this iteration ends (S414). FIG. 6 pictorially illustrates a raw camera image 600 of a ROI in which a portion of the ROI is overshadowed by a blockage 610, which is indicated by a plurality of static features in the form of points 620.

Otherwise (S408)(N), ambient weather conditions are monitored via on-vehicle sensors and/or via off-vehicle systems (S409) and evaluated (S410).

When the ambient weather conditions indicate presence of precipitation, snow, fog, smog, or other conditions that may reduce visibility (S410)(Y), the root cause is indicated to be poor weather (S412), and this iteration ends (S414).

When the ambient weather conditions indicate lack of precipitation, snow, fog, smog, or other conditions that may reduce visibility (S410)(N), the root cause is indicated to be other faults (S411), and this iteration ends (S414) and advances to the subsequent subroutines described with reference to FIGS. 4-2 through 4-5.

FIG. 4-2 describes a second subroutine 420 of the second level analysis routine 400, which provides root cause analysis when the faults indicate there are insufficient inlier points in the essential matrix calculation for triangulation and plane fitting, i.e., the fourth, fifth, eight or eleventh fault codes.

Upon initiation, the second subroutine 420 evaluates the fault code (S421). When none of the fourth, fifth, eight or eleventh fault codes is indicated (S421)(N), this iteration ends (S430), and advances to the third subroutine 440.

Otherwise (S421)(Y), matched feature pairs for the images are loaded (S422), a 3D motion vector is determined for each of the matched feature pairs (S423), and clustering is performed on the motion vectors to identify one or more clusters (S424).

The quantity of matched feature pairs in the largest of the clusters is evaluated and compared to a third threshold (S425).

When the quantity of matched feature pairs in the largest of the clusters is less than a third threshold (S425)(Y), a root cause related to incorrect feature matching is indicated (S426), and this iteration ends (S430).

Figures 1, 7:
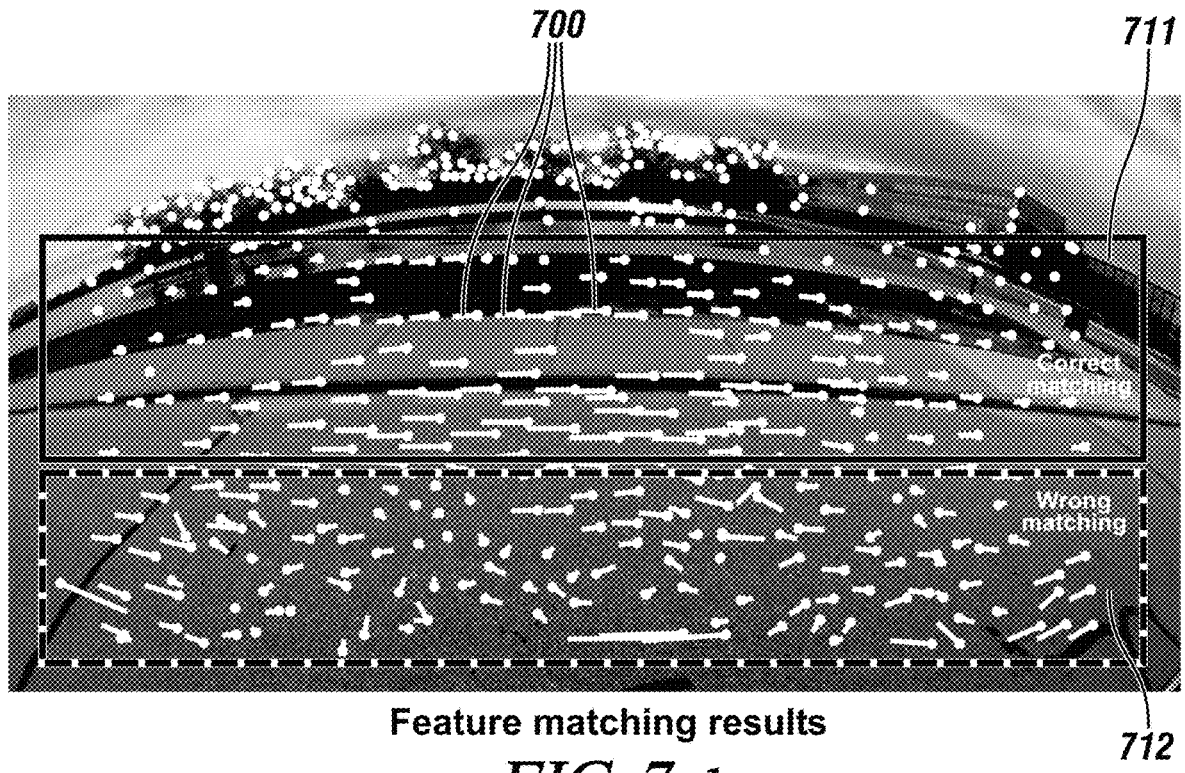
Figures 2, 7:
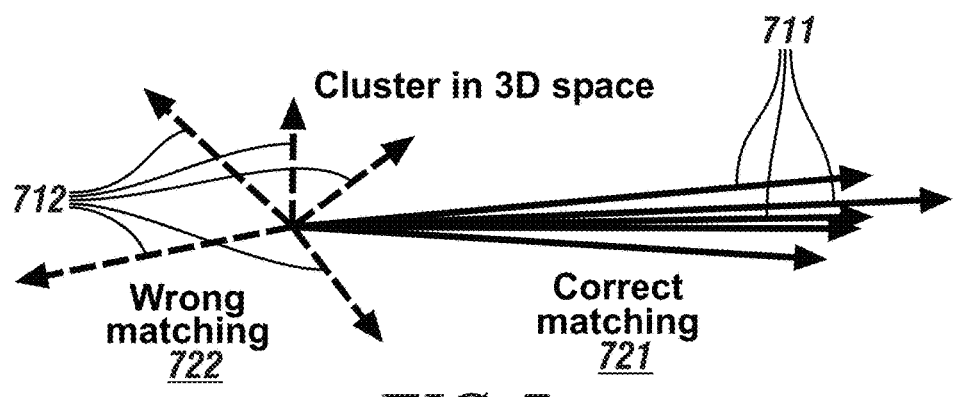

FIG. 7-1 pictorially illustrates a raw image of a ROI of the camera 41, with a multiplicity of feature pairs 700 shown. The multiplicity of feature pairs includes a first set 711 of the feature pairs 700 that are matched feature pairs, and a second set 712 of the feature pairs 700 that are incorrectly matched. FIG. 7-2 schematically illustrates, in 3D space, clusters of the multiplicity of feature pairs, including a first cluster 721 corresponding to the first set 711 of the feature pairs 700 of FIG. 7-1 that are matched feature pairs, and a second cluster 722 corresponding to the second set 712 of the feature pairs 700 of FIG. 7-1 that are incorrectly matched.

Otherwise (S425)(N), when the quantity of matched feature pairs in the second largest of the clusters is less than a fourth threshold (S427)(Y), a root cause related to presence of a dynamic object, e.g., another vehicle, is indicated (S428), and this iteration ends (S430).

Figures 1, 8:
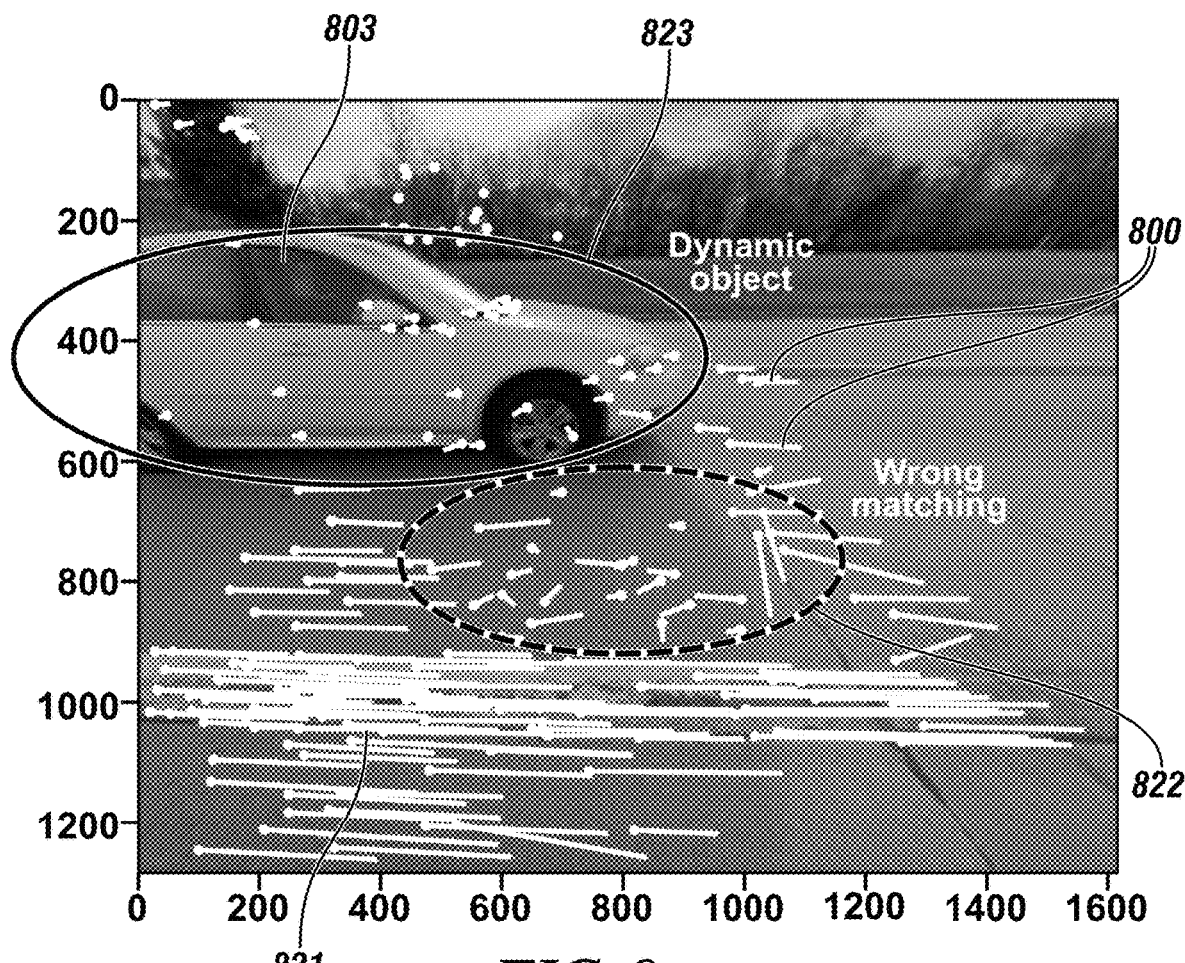
Figures 2, 8:
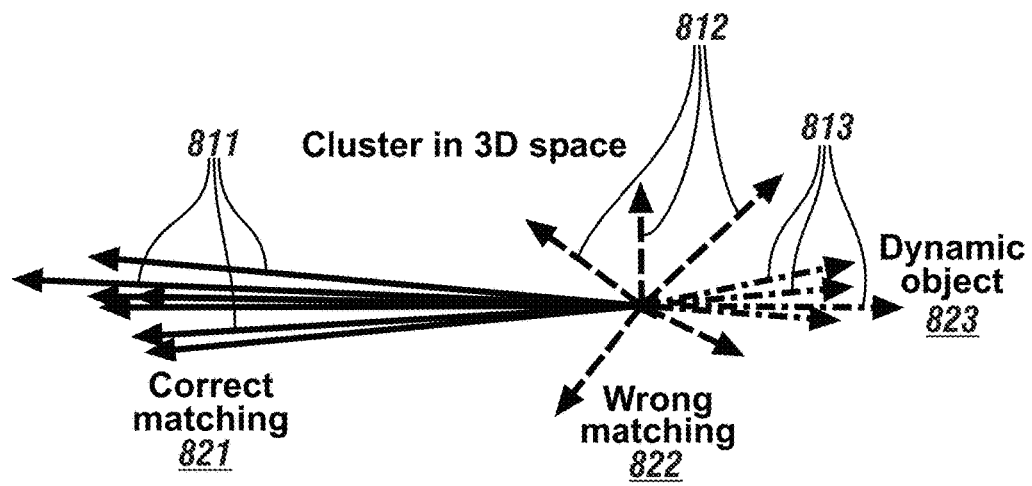

FIG. 8-1 pictorially illustrates a raw image of a ROI of the camera 41 including a dynamic object, e.g., a passing vehicle 803, being shown. A multiplicity of feature pairs 800 are also shown. The multiplicity of feature pairs includes a first set 811 of the feature pairs 800 that are matched feature pairs, a second set 812 of the feature pairs 800 that are incorrectly matched, and a third set 813 of the feature pairs 800 indicating the dynamic object. FIG. 8-2 schematically illustrates, in 3D space, clusters of the multiplicity of feature pairs, including a first cluster 821 corresponding to the first set 811 of the feature pairs 800 of FIG. 8-1 that are matched feature pairs, a second cluster 822 corresponding to the second set 812 of the feature pairs 800 of FIG. 8-1 that are incorrectly matched, and a third cluster 823 corresponding to the third set 813 of the feature pairs 800 that correspond to the dynamic object.

Otherwise (S427)(N), another root cause is indicated (S429), and this iteration ends (S430).

When this iteration ends (S430), execution of the routine 400 advances to the subsequent subroutines described with reference to FIGS. 4-3 through 4-5.

FIG. 4-3 describes a third subroutine 440 of the second level analysis routine 400, which provides root cause analysis when the faults indicate an inaccurate motion vector, i.e., the sixth or seventh fault codes.

Upon initiation, the third subroutine 440 evaluates the fault code (S441). When the sixth nor the seventh fault codes are indicated (S441)(N), this iteration ends (S449), and advances to the fourth subroutine 460.

Otherwise (S441)(Y), the third subroutine 440 checks for presence of a fault with the GPS sensor 49 or the IMU sensor 47 (S442). When there is a fault with the GPS sensor 49 or the IMU sensor 47 (S442)(Y), the root cause is indicated to be a fault with the GPS sensor 49 or the IMU sensor 47 (S443), and this iteration ends (S449).

Otherwise (S442)(N), a yaw error between the motion vector and a predetermined reference vector is determined (S444), with a mean value and standard deviation for the yaw error being determined (S445). When the mean yaw error is greater than a fifth threshold, and the standard deviation of the yaw error is less than a sixth thread (S446)(Y), the root cause is indicated to be a fault with the mounting of the camera, e.g., with a folding mirror when the camera is on a sideview mirror (S447), and this iteration ends (S449).

Otherwise (S446)(N), another root cause is indicated (S448) and this iteration ends (S449).

When this iteration ends (S449), execution of the routine 400 advances to the subsequent subroutines described with reference to FIGS. 4-4 through 4-5.

FIG. 4-4 describes a fourth subroutine 460 of the second level analysis routine 400, which provides root cause analysis related to the motion vector.

Initially, each raw image is subjected to an undistortion process, which include converting the raw image captured using a fish-eye lens to a 2D image or 3D image (S461). After being undistorted, the image is subjected to feature matching and detection processes (S462), vanishing point detection (S463), and a vanishing point quality check (S464). The vanishing point is evaluated to determine if it is stable (S465), and if not (S465)(N), the previous steps are repeated.

When the vanishing point is stable (S465)(Y), an epipolar line normal vector is determined based upon the stable vanishing point (S466).

When a change in the vector angle for the epipolar line normal vector is less than a threshold (S467)(Y), it indicates that the mounting of the camera 41 is intact (S469). When a change in the vector angle for the epipolar line normal vector is greater than the threshold (S467)(N), it indicates that the mounting of the camera 41 has been compromised, e.g., by folding (S468). This result is reported out, and the execution of the routine 400 advances to the subsequent subroutine described with reference to FIG. 4-5.

FIG. 4-5 describes the fifth subroutine 480 of the second level analysis routine 400, which provides root cause analysis related to alignment of the camera 41.

The alignment of the camera is evaluated (S481). If a misalignment has not been detected (S481)(N), this iteration ends (S485). If a misalignment has been detected (S481)(Y), this iteration evaluates whether the twelfth fault code has been generated (S482). When the twelfth fault code has been generated (S482)(Y), a root cause of curb detection is indicated (S483) and this iteration ends (S485). When the twelfth fault code has not been generated (S482)(N), another root cause is indicated (S484) and this iteration ends (S485).

Referring again to FIG. 2, the post-processing analysis routine 500 is composed of a plurality of actions to aggregate and save data from consecutive image files, provide notification of a fault, control, adapt, disable or otherwise mitigate vehicle operation in view of a fault, and adapt operation based upon occurrence of a camera alignment-related fault.

The action to aggregate and save data from consecutive image files may include evaluating diagnostic results (i.e., from the first level analysis routine 300 and the second level analysis routine 400) from consecutive images within a time window to identify a root cause. When the same root cause is detected for over a quantity of n files within the time window, the result is output. Otherwise, the result may be subject to statistical analysis to identify a trend over a longer time period. This action also includes capturing and storing the images 99 along with metadata related to the analysis and outputs from the first level analysis routine 300 and the second level analysis routine 400 for a period of time. This may include communicating all or a portion of the camera images 99 and metadata to an off-board system.

The action to provide notification of the camera alignment-related fault may include generating and sending a visual, auditory, haptic, or other message notifying the vehicle operator of the camera alignment-related fault. This action to provide notification may also include generating a service request to a vehicle service center.

The action to control, adapt, disable or otherwise mitigate vehicle operation in view of occurrence of the camera alignment-related fault includes disabling systems having functions that rely upon the accurate operation of the camera 41, e.g., disabling the autonomic vehicle control system 20 that relies upon the camera 41. In this manner, the various features can indicate faults of the camera alignment system employing logic to isolate faults and explicitly classify different root causes of faults.

In addition, the system, method, and/or apparatus 200 to monitor alignment may automatically adjust mechanical alignment of the respective one of the cameras 41 in relation to the vehicle, or may adjust internal parameters of the respective one of the cameras 41, such as lens angle, focal length, filtering, etc.

On-vehicle cameras are subjected to dynamically changing internal and external factors that may affect alignment, and thus affect operation of the on-vehicle systems whose operations rely upon the camera images. The concepts described herein provide a method, system and/or apparatus that is able to capture an image file from the on-vehicle camera; execute a first level analysis of the image file, the vehicle operating parameters, and the camera signal parameters to detect dynamic conditions and a plurality of image feature parameters that affect camera alignment; detect an error with one of the dynamic conditions or the plurality of image feature parameters that affects the camera alignment; execute a second level analysis of the camera signal parameters to identify a root cause indicating one of the dynamic conditions or the image feature parameters that affects the camera alignment based upon the error; detect a camera alignment-related fault based upon the root cause; and control vehicle operation based upon the camera alignment-related fault. Accordingly, the claimed embodiments effectuate an improvement in the technical field.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special-purpose hardware-based systems that perform the specified functions or acts, or combinations of special-purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

The use of ordinals such as first, second and third does not necessarily imply a ranked sense of order, but rather may distinguish between multiple instances of an act or structure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A system for on-vehicle camera alignment monitoring comprising:
   a vehicle spatial monitoring system including an on-vehicle camera in communication with a controller,
   the controller including an instruction set that is executable to:
   monitor vehicle operating parameters and camera signal parameters;
   capture a plurality of image files from the on-vehicle camera over a defined time window;
   execute a first level analysis of the plurality of image files, the vehicle operating parameters, and the camera signal parameters to detect dynamic conditions and a plurality of image feature parameters that affect camera alignment;
   detect an error with one of the dynamic conditions or the plurality of image feature parameters that affects the camera alignment;
   execute a second level analysis of the camera signal parameters to identify a root cause selected from at least one of insufficient lighting, lens blockage, inclement weather, and mounting faults and indicating one of the dynamic conditions or the image feature parameters that affects the camera alignment based upon the error;
   aggregate data from the plurality of image files and evaluate results from the first level analysis and the second level analysis to identify a trend in the root cause over the defined time window;
   detect a camera alignment-related fault based upon the root cause; and
   control vehicle operation based upon the camera alignment-related fault by at least one of:
   generating at least one of a visual, auditory, and haptic message to thereby notify a vehicle operator of the camera alignment-related fault,
   generating a service request to a vehicle service center, and
   disabling vehicle systems that rely on operation of the on-vehicle camera.

2. The system of claim 1, wherein the dynamic conditions include vehicle speed, acceleration and yaw rate, and wherein the instruction set is executable to detect the error when one of the vehicle speed, the acceleration, or the yaw rate is outside a respective allowable range based upon the dynamic conditions.

3. The system of claim 1, wherein the dynamic conditions include a road surface, and wherein the instruction set is executable to detect the error when an uneven road surface is detected.

4. The system of claim 1, wherein the plurality of image feature parameters includes at least one of a feature extraction count, a feature match count, an essential matrix inlier point count, a recovering pose feature count, a triangulation inlier point count, a two-dimensional road region of interest (ROI) feature point count, a three-dimensional road ROI feature point count, and a plane-fitting inlier point count.

5. The system of claim 4, wherein the instruction set is executable to detect the error when the one of the plurality of image feature parameters is outside a respective allowable range.

6. The system of claim 5, wherein the instruction set being executable to execute the second level analysis of the camera signal parameters to identify a root cause associated with the plurality of image feature parameters comprises the instruction set being executable to identify the at least one of insufficient lighting, lens blockage, and inclement weather when one of the plurality of image feature parameters is outside a respective allowable range.

7. The system of claim 1, further comprising the instruction set being executable to capture a plurality of consecutive image files from the on-vehicle camera;
wherein the instruction set is executable to:
determine a plurality of matched feature pairs between the plurality of consecutive image files;
determine a plurality of motion vectors based upon the plurality of matched feature pairs;
detect an error with the plurality of motion vectors that affects the camera alignment; and
execute the second level analysis of the camera signal parameters to identify the root cause of the error with the plurality of motion vectors that affects the camera alignment;
wherein the root cause of the error with the plurality of motion vectors that affects the camera alignment includes a fault with mounting of the on-vehicle camera.

8. The system of claim 7, further comprising the instruction set being executable to detect a camera alignment-related fault based upon the root cause of the error with the plurality of motion vectors that affects the camera alignment; and
control vehicle operation based upon the camera alignment-related fault.

9. The system of claim 7, further comprising the instruction set being executable to cluster the plurality of motion vectors to determine inlier points in an essential matrix calculation, a triangulation and plane fitting; and identify an insufficient quantity of inlier points based thereon.

10. The system of claim 1, wherein the instruction set being executable to control vehicle operation based upon the camera alignment-related fault comprises the instruction set being executable to generate at least one of the visual, auditory, and haptic message to thereby notify the vehicle operator of the camera alignment-related fault.

11. The system of claim 1, further comprising an autonomic vehicle control system operatively connected to the vehicle spatial monitoring system; wherein the instruction set being executable to control operation based upon the camera alignment-related fault comprises the instruction set being executable to disable the autonomic vehicle control system based upon the camera alignment-related fault.

12. The system of claim 1, further comprising communicating the plurality of image files, the vehicle operating parameters, the camera signal parameters, and the plurality of image feature parameters to an off-board system.

13. A system for on-vehicle camera alignment monitoring comprising:
a vehicle spatial monitoring system including an on-vehicle camera in communication with a controller, the controller including an instruction set that is executable to:
monitor vehicle operating parameters and camera signal parameters;
capture a plurality of image files from the on-vehicle camera over a defined time window;
analyze the plurality of image files, the vehicle operating parameters, and the camera signal parameters to detect dynamic conditions, a plurality of image feature parameters, and a plurality of motion vectors that affect camera alignment;
detect an error with one of the dynamic conditions, the plurality of image feature parameters, and the plurality of motion vectors that affects the camera alignment;
analyze the camera signal parameters to identify a root cause selected from at least one of insufficient lighting, lens blockage, and mounting faults and indicating one of the dynamic conditions, the image feature parameters, or the plurality of motion vectors that affects the camera alignment based upon the error;
aggregate data from the plurality of image files and evaluate results from analysis of the plurality of image files, the vehicle operating conditions, and the camera signal parameters to identify a trend in the root cause over the defined time window;
detect a camera alignment-related fault based upon the root cause; and
control vehicle operation based upon the camera alignment-related fault by at least one of:
generating at least one of a visual, auditory, and haptic message to thereby notify a vehicle operator of the camera alignment-related fault,
generating a service request to a vehicle service center, and
disabling vehicle systems that rely on operation of the on-vehicle camera.

14. The system of claim 13, wherein the plurality of image feature parameters includes at least one of a feature extraction count, a feature match count, an essential matrix inlier point count, a recovering pose feature count, a triangulation inlier point count, a two-dimensional road ROI feature point count, a three-dimensional road ROI feature point count, and a plane-fitting inlier point count.

15. The system of claim 14, wherein the instruction set is executable to detect the error when the one of the plurality of image feature parameters is outside a respective allowable range.

16. The system of claim 15, wherein the instruction set being executable to identify a root cause associated with the plurality of image feature parameters comprises the instruction set being executable to identify the at least one of insufficient lighting, lens blockage, and inclement weather condition when one of the plurality of image feature parameters is outside a respective allowable range.

17. The system of claim 13, further comprising the instruction set being executable to capture a plurality of consecutive image files from the on-vehicle camera;
wherein the instruction set is executable to:
determine a plurality of matched feature pairs between the plurality of consecutive image files;
determine a plurality of motion vectors based upon the plurality of matched feature pairs;
detect an error with the plurality of motion vectors that affects the camera alignment; and
identify the root cause of the error with the plurality of motion vectors that affects the camera alignment;

wherein the root cause of the error with the plurality of motion vectors that affects the camera alignment includes a fault with mounting of the on-vehicle camera.

18. The system of claim 17, further comprising the instruction set being executable to:
    detect a camera alignment-related fault based upon the root cause of the error with the plurality of motion vectors that affects the camera alignment; and
    control vehicle operation based upon the camera alignment-related fault.

19. The system of claim 17, further comprising the instruction set being executable to cluster the plurality of motion vectors to determine inlier points in an essential matrix calculation, a triangulation and plane fitting; and identify an insufficient quantity of inlier points based thereon.

20. A system for on-vehicle camera alignment monitoring comprising:
    a vehicle spatial monitoring system including an on-vehicle camera in communication with a controller, and an autonomic vehicle control system operatively connected to the vehicle spatial monitoring system, the controller including an instruction set that is executable to:
        monitor vehicle operating parameters and camera signal parameters;
        capture a plurality of image files from the on-vehicle camera over a defined time window;
        analyze the plurality of image files, the vehicle operating parameters, and the camera signal parameters to detect dynamic conditions, a plurality of image feature parameters, and a plurality of motion vectors that affect camera alignment;
        detect an error with one of the dynamic conditions, the plurality of image feature parameters, and the plurality of motion vectors that affects the camera alignment;
        analyze the camera signal parameters to identify a root cause selected from at least one of insufficient lighting, lens blockage, inclement weather, and mounting faults and indicating one of the dynamic conditions, the image feature parameters, or the plurality of motion vectors that affects the camera alignment based upon the error;
        aggregate data from the plurality of image files and evaluate results from the first level analysis and the second level analysis to identify a trend in the root cause over the defined time window;
        detect a camera alignment-related fault based upon the root cause; and
        disable the autonomic vehicle control system based upon the camera alignment-related fault.

* * * * *